US010525769B2

(12) United States Patent
Gregg et al.

(10) Patent No.: US 10,525,769 B2
(45) Date of Patent: Jan. 7, 2020

(54) REINFORCED AXLE JOINT (71) Applicant: HENDRICKSON USA, L.L.C., Itasca, IL (US)

(72) Inventors: Dane Gregg, Uniontown, OH (US); R. Scott Fulton, Hudson, OH (US); Phillippi R. Pierce, Canton, OH (US); Jay D. White, Massillon, OH (US); Jeffrey R. Wittlinger, Uniontown, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 185 days.

(21) Appl. No.: 15/796,892

(22) Filed: Oct. 30, 2017

(65) Prior Publication Data

US 2018/0117965 A1   May 3, 2018

Related U.S. Application Data (60) Provisional application No. 62/414,924, filed on Oct. 31, 2016.

(51) Int. Cl.
| | |
|---|---|
| *B60B 35/00* | (2006.01) |
| *B60B 35/08* | (2006.01) |
| *B60B 35/04* | (2006.01) |
| *B23K 26/21* | (2014.01) |
| *B23K 20/12* | (2006.01) |
| *B60B 27/00* | (2006.01) |
| *B60B 35/16* | (2006.01) |
| *F16D 55/00* | (2006.01) |

(Continued)

(52) U.S. Cl.
CPC ............ *B60B 35/006* (2013.01); *B23K 20/12* (2013.01); *B23K 26/21* (2015.10); *B60B 27/0052* (2013.01); *B60B 27/0057* (2013.01); *B60B 35/004* (2013.01); *B60B 35/04* (2013.01); *B60B 35/08* (2013.01); *B60B 35/16* (2013.01); *B60B 37/10* (2013.01); *B60B 2310/302* (2013.01); *B60B 2310/3025* (2013.01); *B60B 2310/3026* (2013.01); *B60T 1/00* (2013.01); *F16D 2051/003* (2013.01); *F16D 2055/0008* (2013.01)

(58) Field of Classification Search
CPC ..... B60B 35/00; B60B 35/006; B60B 35/007; B60B 35/04; B60B 35/166; B60G 2206/50
See application file for complete search history.

(56) References Cited

U.S. PATENT DOCUMENTS

| | | | |
|---|---|---|---|
| 3,465,545 A * | 9/1969 | Stamm | B23K 20/129 464/179 |
| 4,080,003 A | 3/1978 | Boughton | |

(Continued)

FOREIGN PATENT DOCUMENTS

EP          1516132 A2     3/2005

*Primary Examiner* — Jason R Bellinger
(74) *Attorney, Agent, or Firm* — Dureska & Moore, LLC; David P. Dureska; Greg Strugalski (57) ABSTRACT An axle and wheel end assembly includes a tubular axle housing with an annular end surface. The axle and wheel end assembly also includes a spindle with an annular end surface welded to the annular end surface of the tubular axle housing at an attachment periphery. The axle and wheel end assembly further includes reinforcing structure fixed to the tubular axle housing and spindle. The reinforcing structure is located to encompass at least a portion of the attachment periphery.

31 Claims, 4 Drawing Sheets (51) Int. Cl.
*B60T 1/00* (2006.01)
*F16D 51/00* (2006.01)
*B60B 37/10* (2006.01)

(56) References Cited

U.S. PATENT DOCUMENTS

| | | | |
|---|---|---|---|
| 4,768,839 A | 9/1988 | Spindler | |
| 5,226,691 A | 7/1993 | Kane | |
| 5,538,330 A | 7/1996 | Ehrlich | |
| 5,855,416 A | 1/1999 | Tasker et al. | |
| 6,024,418 A * | 2/2000 | Ebert | B23K 31/02 |
| | | | 301/130 |
| 6,572,199 B1 * | 6/2003 | Creek | B60B 35/08 |
| | | | 301/124.1 |
| 8,939,518 B2 * | 1/2015 | Ebert | B60B 35/14 |
| | | | 301/131 |
| 2011/0175434 A1 | 7/2011 | MacKarvich et al. | |
| 2016/0023513 A1 | 1/2016 | Crockett, Jr. | |

* cited by examiner

REINFORCED AXLE JOINT

CROSS-REFERENCE TO RELATED APPLICATION

This application claims the benefit of U.S. Provisional Patent Application Ser. No. 62/414,924 filed Oct. 31, 2016.

TECHNICAL FIELD

The subject matter of this application generally relates to axles and wheel end assemblies for vehicles. Particularly, the subject matter relates to a heavy-duty vehicle axle and wheel end assembly that is formed with structure reinforcing a weld joint between a spindle and an axle.

BACKGROUND

The heavy-duty vehicle industry typically utilizes wheel end assemblies on opposite ends of one or more axles. Each wheel end assembly typically includes a hub mounted on a bearing assembly. The bearing assembly is mounted on an outboard end a spindle of the wheel end assembly, to enable rotation of the hub relative to the spindle.

The spindle is typically joined to a tubular end portion of an axle by a welding operation to form an axle and wheel end assembly. A weld joint between the spindle and the tubular portion of the axle experiences heavy loads that induce localized deflection, distortion and stress around the weld joint. There is also a region near the weld joint that can potentially be detrimentally affected by heat and stress concentrations generated during the welding operation. Thus, the tubular portion of the axle and the end portion of the spindle components are often selected to be of dimensions and materials that can withstand the loads and stresses that a heavy-duty vehicle encounters in operation, as well as the heat and stress concentrations that are generated during manufacture of the axle and wheel end assembly.

Previously known axle and wheel end assemblies for a heavy-duty vehicle typically incorporate a standard size tubular portion of the axle. An issue with currently known joining is that it can be sensitive to geometry of the components. That is, a skirt wall thickness of a spindle needs to be substantially similar to the wall thickness of the tubular portion of the axle in order to get a desirable curl shape of weldment residual material during the joining operation. Inner and outer diameters of the spindle skirt and the inner and outer diameters of the tubular portion of the axle also impact the curl shape of the weldment residual material. A desirable curl shape without a sharp edge is important for getting acceptable integrity and fatigue life from the axle tubular portion to spindle weld joint. Joints that have an undesirable curl shape would generally result in scrapping of the axle and wheel end assemblies, thereby adding to the overall cost of manufacturing.

Axle and wheel end assemblies also include brake component retention or mounting structure, commonly known as a spider or torque plate. The brake component retention or mounting structure is typically fixed to the axle or to the spindle. The location of the spider or torque plate along the axle is generally determined by the brake system structure and user requirements. The location of the spider or torque plate is typically axially spaced from the weld joint between the spindle and the axle.

The previously known axle and wheel end assemblies tend to be relatively heavy which contributes to the overall weight of the heavy-duty vehicle and, therefore, limit the amount of cargo that may be legally carried by the heavy-duty vehicle. The previously known axle and wheel end assemblies may waste material during manufacturing which increases cost and inventory on-hand. Suitable known joining methods may be limited and require a significant capital investment in equipment.

The limitations, disadvantages and drawbacks associated with previously known axle and wheel end assemblies make it desirable to provide an improved axle and wheel end assembly and a method of manufacturing the improved axle and wheel end assembly.

SUMMARY

A summary is provided to introduce concepts that are described below. This summary is not intended to identify key factors or essential features of the disclosed subject matter, nor is it intended to be used to limit the scope of the disclosed subject matter and claims. The disadvantages and drawbacks associated with known axle and wheel end assemblies are overcome with an axle and wheel end assembly formed with a weld joint between a spindle and an axle housing that is reinforced by structure encompassing the joint, according to the concepts of the disclosed subject matter.

The concepts of the disclosed subject matter provide a relatively lighter weight axle and wheel end assembly with less deflection, distortion and stress at the weld joint, reduce material costs and inventory, permit a relatively heavier amount of cargo that can be carried by the heavy-duty vehicle, and allow for lower capital cost. The concepts of the disclosed subject matter also allow the use of various joining processes that were previously undesirable in the manufacture of an axle and wheel end assembly. An axle and wheel end assembly made according to concepts of the disclosed subject matter is relatively less sensitive to geometry of the components. That is, a spindle with a given skirt wall thickness can be used with axle tubular portions having a different wall thickness. This may reduce the number of different relatively expensive spindles that have to be manufactured and carried in inventory. The reinforced joint of the axle and wheel end assembly made according to concepts of the disclosed subject matter may also reduce scrap.

An axle and wheel end assembly, according to one aspect of the disclosed subject matter, includes a tubular axle tube housing with an annular end surface. The axle and wheel end assembly also includes a spindle with an annular end surface joined to the annular end surface of the tubular axle housing at an attachment periphery. The joining operation may be done by any suitable type of joining. The axle and wheel end assembly further includes reinforcing structure fixed to the tubular axle housing and to the spindle. The reinforcing structure is located to span and encompass at least a portion of the attachment periphery.

Preferably, the reinforcing structure is brake component mounting structure that spans and encompasses substantially all of the attachment periphery. Where the end surfaces are joined together a heat affected zone adjacent the attachment periphery is created. The brake component mounting structure, preferably, encompasses substantially all of the heat affected zone to reinforce and strengthen the weld joint and the heat affected zone. The end surfaces of the axle housing and the spindle may be joined together by a friction welding operation that creates the heat affected zone. The end surfaces of the axle housing and the spindle may be joined together by a laser welding operation that creates a relatively smaller heat affected zone.

The end surfaces of the axle housing and the spindle each have an annular shape with substantially equal outer diameters. The end surfaces of the axle housing and the spindle may have end surfaces with substantially equal inner diameters. The end surfaces of the axle housing and the spindle may have end surfaces with differing inner diameters. The reinforced and strengthened weld joint stiffens the resulting structure so the axle and wheel end assembly is better able to resist deflection and withstand stress to improve axle durability and service life.

A method of manufacturing an axle and wheel end assembly, according to another aspect, includes the step of providing an axle with a tubular housing having an annular end surface. The method also includes joining an annular end surface of a spindle to the annular end surface of the tubular axle housing to form an attachment periphery. The joining operation may be done by any suitable type of joining. The method further includes fixing reinforcing structure to the tubular axle housing and the spindle to span and encompass at least a portion of the attachment periphery.

The method preferably includes the step of locating the reinforcing structure to span and encompass substantially all of the attachment periphery. The method includes the step of joining the annular end surface of the spindle to the annular end surface of the axle central tube housing in a manner that creates a heat affected zone adjacent the attachment periphery. The reinforcing structure, is located to span and encompass substantially all of the heat affected zone.

DRAWINGS

The following description and drawings set forth certain illustrative aspects and implementations of the disclosed subject matter. These are indicative of but a few of the various ways in which one or more embodiments, aspects and implementations may be employed. Further features of the disclosed subject matter will become apparent to those skilled in the art from reading the following description with reference to the accompanying drawings, in which.

DESCRIPTION

The disclosed subject matter is described with reference to the drawings, in which like reference numerals are used to refer to like elements throughout the description. In the description, for purposes of explanation, numerous specific details are set forth in order to provide an understanding of the disclosed subject matter. It will be understood, however, that the disclosed subject matter can be employed, practiced and implemented without these particular details.

Figure 1:
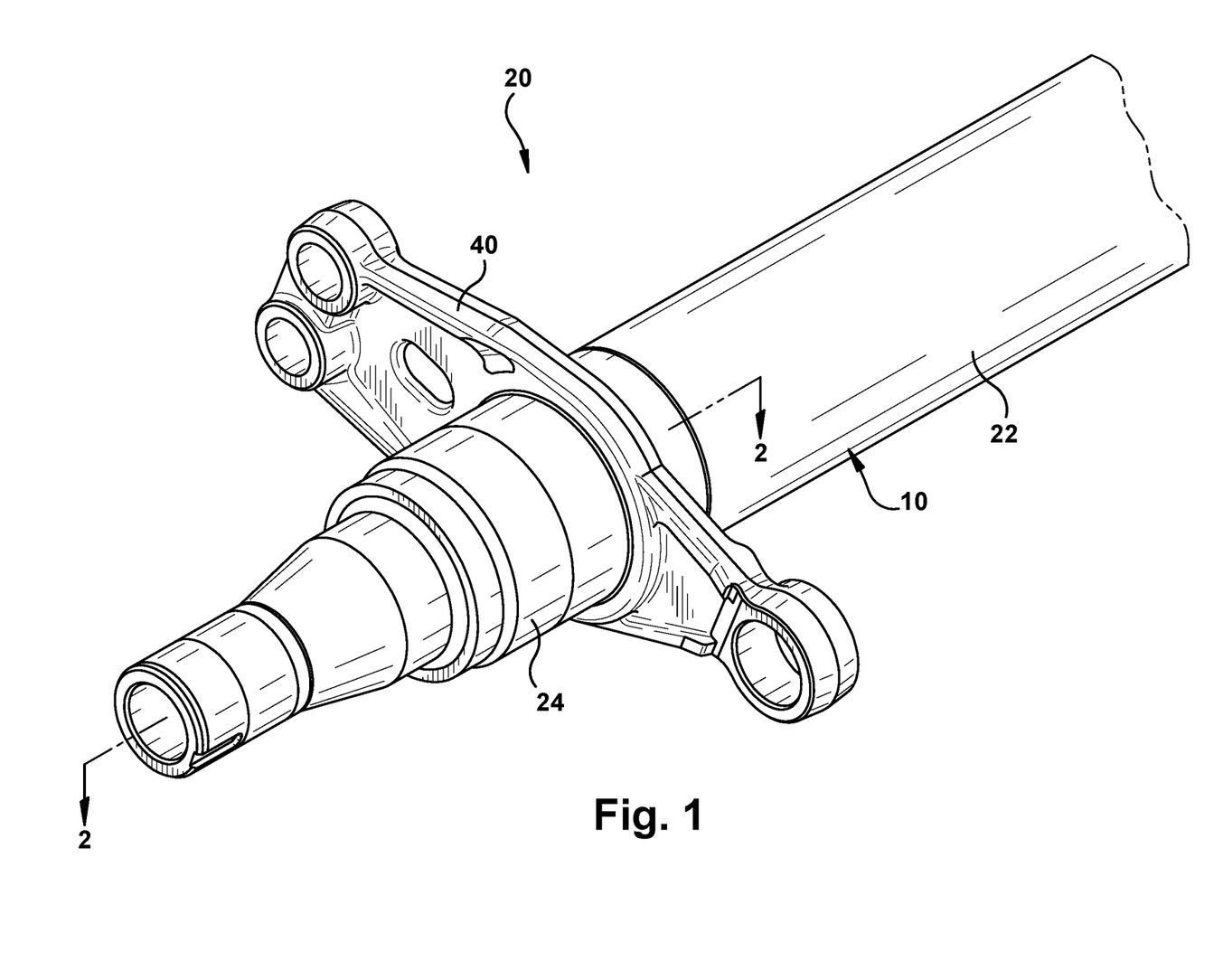
FIG. 1 is an overall fragmentary perspective view of an axle and wheel end assembly, constructed according to one aspect, and showing a reinforcing structure mounted on an axle and a spindle of an axle and wheel end assembly.

An improved axle and wheel end assembly 20 (FIGS. 1-3) is intended for use on a heavy-duty vehicle, such as a trailer. The axle and wheel end assembly 20, according to one aspect, is provided that advantageously enables the use of relatively thinner and, thus, lighter weight components such as an axle 10 that includes a tubular central portion or axle housing 22 and a tubular spindle 24. This improvement is accomplished by providing the axle and wheel end assembly 20 with a joint 26 that is protected and strengthened with reinforcing structure 40, such as a spider, torque plate or brake retention structure. The reinforcing structure 40 completely encompasses or encircles in a circumferential direction as well as bridges or spans the joint 26 and a heat affected zone HAZ (FIG. 3) near the joint in an axial direction. The heat affected zone HAZ can be a region of stress concentration. The resultant increase in section modulus about the joint 26 and heat affected zone HAZ by the addition of the reinforcing structure 40 strengthens and protects the axle and wheel end assembly 20 from deflection, distortion and stress at the weld joint during operation of the heavy-duty vehicle and/or that may be created by a joining process.

Figure 3:
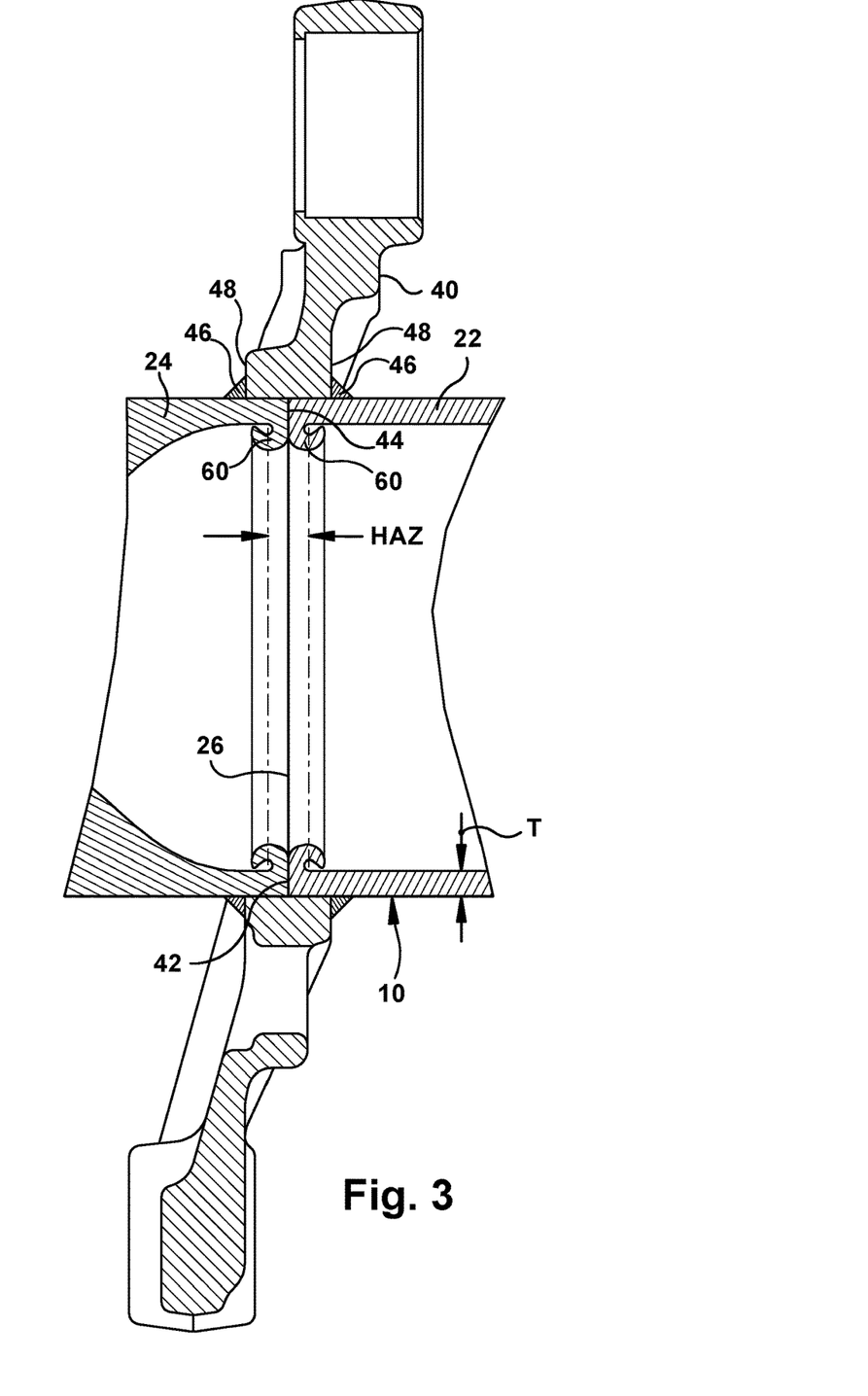
FIG. 3 is an enlarged fragmentary cross-sectional view of the portion of the axle and wheel end assembly of FIG. 2 which is manufactured according to one type of joining operation.

The heat affected zone HAZ is created by the joining operation and is located adjacent to the joint 26 or attachment periphery. The heat affected zone HAZ extends in opposite axial directions from the joint 26 for a relatively short distance. The exact distances that the heat affected zone HAZ extend may depend on a number of factors, such as the materials used, the respective thicknesses of the tubular axle housing 22 and spindle 24 and/or the joining method used. It will be appreciated that any suitable means of permanently joining the spindle 24 to the tubular axle housing 22 may be used, for example friction, MIG, TIG, arc, oxy-fuel, gas, laser, projection, butt or capacitance welding and the like.

The tubular axle housing 22 of the improved axle and wheel end assembly 20 is of a preferably round cross-section and has an annular end surface 42. The tubular axle housing 22 may be made of any suitable material, such as steel. The spindle 24 of the axle and wheel end assembly 20 also has a tubular end portion or skirt of a preferably round cross-section and has an annular end surface 44. The spindle 24 may be made of any suitable material, such as steel, and is generally formed as one-piece by upset forging. The tubular axle housing 22 and skirt of the spindle 24 could have any suitable cross-sectional shape and size. Preferably, the inner and outer diameters of the tubular axle housing 22 and of the spindle 24 are substantially the same at their respective annular end surfaces 42, 44 according to one aspect. It is contemplated that the inner diameters of the tubular axle housing 22 and spindle 24 could be different, such as the tubular axle housing having a relatively larger inner diameter that was previously thought undesirable. This would allow a reduced inventory of relatively expensive spindles 24 because the spindles do not have to match inner diameters with the tubular axle housing 22.

The respective end surfaces 42, 44 of the axle central tube housing 22 and the spindle 24 are joined together according to one aspect. The annular end surface 44 of the spindle 24 is joined to the annular end surface 42 of the tubular axle housing 22 at the weld joint 26 or attachment periphery. Preferably, the weld joint 26 extends 360° continuously around the entire attachment periphery of the axle and wheel end assembly 20. The weld joint 26 also has a radial thickness or dimension at least equal to the wall thickness T of the tubular axle housing 22 and of the spindle 24, as illustrated in FIG. 3. As a result of the joining process, surface discontinuities 60 may form that may affect fatigue life and create stress concentrations. Any surface discontinuities at the weld joint 26 that forms on the outer surface of the axle and wheel end assembly 20 are typically removed by a suitable process, such as shearing, turning or grinding. The surface discontinuities 60 (FIG. 3) at the joint 26 that forms on the inner surface of the tubular axle housing 22 and spindle 24 are generally left in place.

The axle and wheel end assembly 20 further includes the reinforcing structure 40, preferably in the form of brake retention structure commonly known as a spider, torque plate or brake component mounting structure, fixed to the tubular axle housing 22 and spindle 24. Any suitable means can be used to permanently attach the reinforcing structure 40 to the spindle 24 and the tubular axle housing 22, for example such as welding to form welds 46 extending about the entire circumferential periphery of the tubular axle housing and the spindle. The reinforcing structure 40 is located to encompass at least a portion of the weld joint 26 and thereby strengthen and protect the weld joint. Preferably, the reinforcing structure 40 is located to encompass or encircle substantially all of the weld joint 26 and the heat affected zone HAZ for 360° in the peripheral or circumferential direction around the axle central tube housing 22 and spindle 24. The reinforcing structure 40 is also preferably located to span or bridge the heat affected zone HAZ in a direction along a longitudinal central axis A (FIG. 2) of the tubular axle housing 22 and spindle 24. It is intended that the welds 46 are to be considered separate from, and form no part of, the reinforcing structure 40. The reinforcing structure 40 has axially opposite side end surfaces 48. A first one of the side end surfaces 48 is located axially on one side of the weld joint 26 and the other second side end surface is located axially on the opposite side of the weld joint.

The axle and wheel end assembly 20 typically depends from and extends transversely across a frame member (not shown) of the heavy-duty vehicle. A typical heavy-duty vehicle, such as a trailer, includes one or more non-drive axles suspended from the trailer, with each of the axles 22 having a wheel end 24 mounted on respective opposite ends of the axle. It will be apparent that the disclosed concept may be applied to drive axles as well, and other heavy-duty vehicles such as trucks employing drive and non-drive axles. While only one axle and wheel end assembly 20 is shown in the drawings, it will be apparent that axle and wheel end assemblies are located on axially opposite ends of the tubular axle housing 22. For the sake of clarity, only one end portion of the axle and wheel end assembly 20 is described.

The axle and wheel end assembly 20 includes a bearing assembly having an inboard bearing 82 (FIG. 2) and an outboard bearing 84 mounted on the spindle 24. That is, inboard bearing 82 is mounted on the outer diameter of the spindle 24 with its inboard surface in abutment with a shoulder 86 formed in the spindle. The outboard bearing 84 is mounted on the spindle 24 near the outboard end portion of the spindle. The inboard and outboard bearings 82, 84 are spaced apart in a direction along the longitudinal central axis A of the axle and wheel end assembly 20. An optional bearing spacer 88 may be located between the bearings 82, 84 to maintain proper spacing between, and preload, the bearings. A nut assembly 100 is threaded onto the outboard end of spindle 24 in a known manner and secures bearings 82, 84 and bearing spacer 88 in place. The nut assembly 100 may typically include an inboard nut, a lock washer, an outboard nut, and a set screw, as is known.

Figure 2:
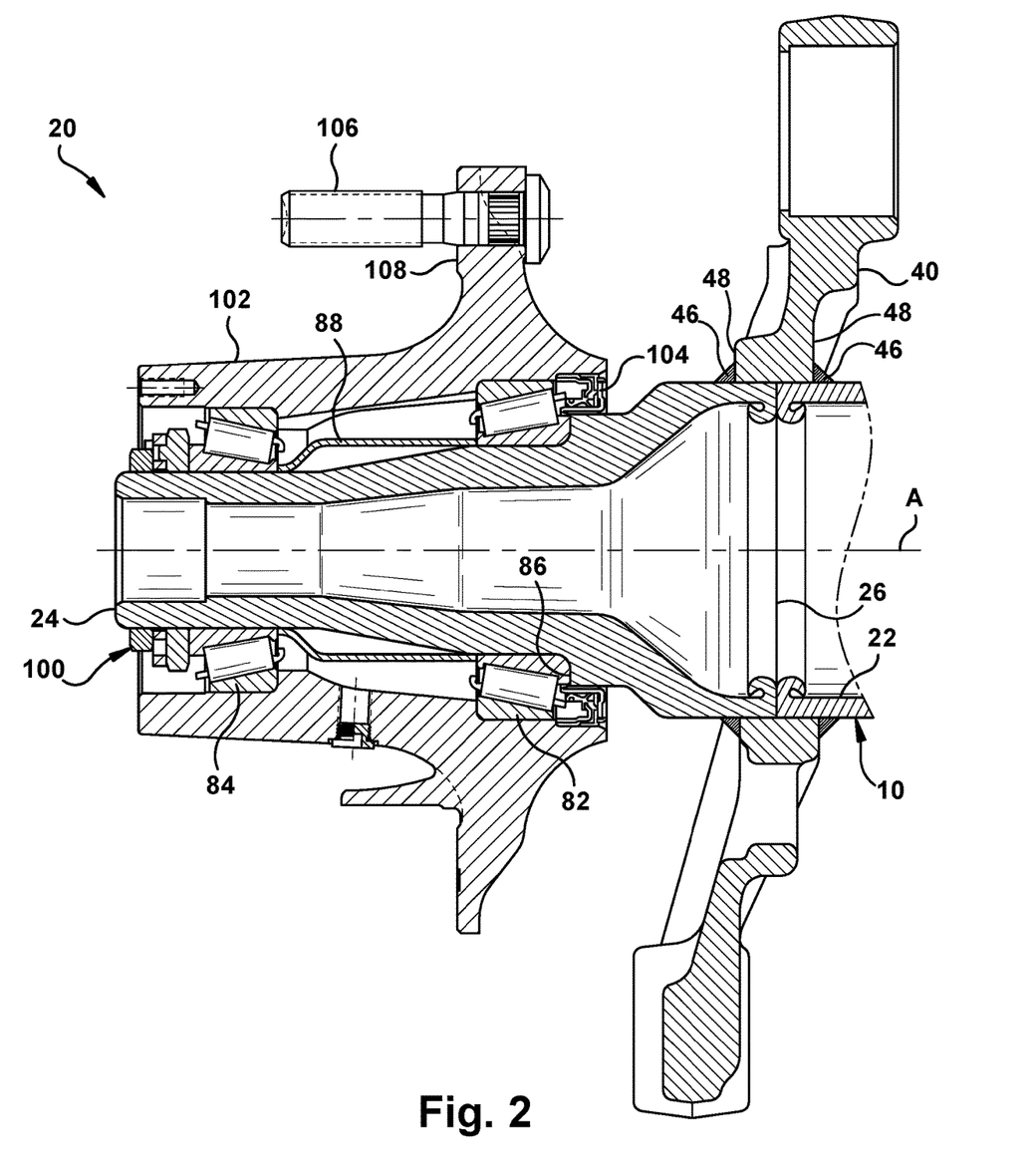
FIG. 2 is a fragmentary cross-sectional view of a portion of the axle tubular portion and wheel end assembly of FIG. 1, taken approximately along line 2-2 in FIG. 1, and showing the reinforcing structure mounted on the axle and spindle.

A wheel hub 102 is supported on the inboard and outboard bearings 82, 84 for rotation relative to the spindle 24 in a known manner. A hubcap (not shown) is mounted on the outboard end of hub 102 to close the outboard end of the axle and wheel end assembly 20. A circumferentially continuous main seal 104 is mounted on the inboard end of the hub 102 and closes the inboard end of the hub. A plurality of interference fit studs 106 (only one shown) extends from the hub 102. The studs 106 are used to mount components of a tire rim and tire (not shown) against a mounting face 108 of hub 102 and, thus, on the end of the axle and wheel end assembly 20.

While most axle and wheel end assemblies 20 include typical features, the design and arrangement of specific components of each wheel end assembly, as well as the axle, vary according to the specific vehicle design and its anticipated loads and uses. For example, some heavy-duty vehicles include axle and wheel end assemblies 20 that incorporate a standard size axle having an outside diameter of about 5.0 inches and a relatively large wall thickness of about 0.562 inches for a heavy-duty commercial vehicle. The typical standard size 5.0 inch outside diameter axle has a wall thickness in the range of about 0.526 inches to about 0.750 inches.

The tubular axle housing 22 may have an outer diameter of about 5.0 inches. Incorporating one aspect of the disclosed subject matter into the axle and wheel end assembly 20 enables the use of a relatively thinner wall tube for the axle central tube housing 22 and even the spindle 24. For example, the thickness T (FIG. 3) of the tubular axle central tube housing 22 can be in the range from about 0.425 inch to about 0.640 inch and preferably about 0.460 inch instead of the previous 0.562 inch for the same GAWR. This results in a substantial weight savings without impacting the performance characteristics, strength and durability of the axle and wheel end assembly 20. However, it should be apparent that the axle and wheel end assembly could incorporate the reinforcing structure with a standard size axle having a relatively greater wall thickness.

The disclosed subject matter also has applicability when the axle central tube housing 22 has a relatively large outer diameter of about 5.75 inches for a heavy-duty commercial vehicle. Some heavy-duty vehicles include axle and wheel end assemblies 20 that incorporate a standard size axle having an outside diameter of about 5.75 inches and a relatively large wall thickness of about 0.562 inches. The typical standard size 5.75 inch outside diameter axle has a wall thickness in the range from about 0.301 inches to about 0.400 inches. Incorporating the aspect of the disclosed subject matter into the axle and wheel end assembly 20 enables the use of a relatively thinner wall tube for the tubular axle housing 22 and perhaps even the spindle 24. For example, the thickness T of the tubular axle central tube housing 22 with a 5.75 inches outer diameter, can be in the range of 0.225 inch to 0.300 inch and preferably about 0.250 inch instead of a previous thickness of about 0.310 inch for the same GAWR. This results in a substantial weight savings without impacting the performance characteristics, strength and durability of the axle and wheel end assembly 20.

Figure 4:
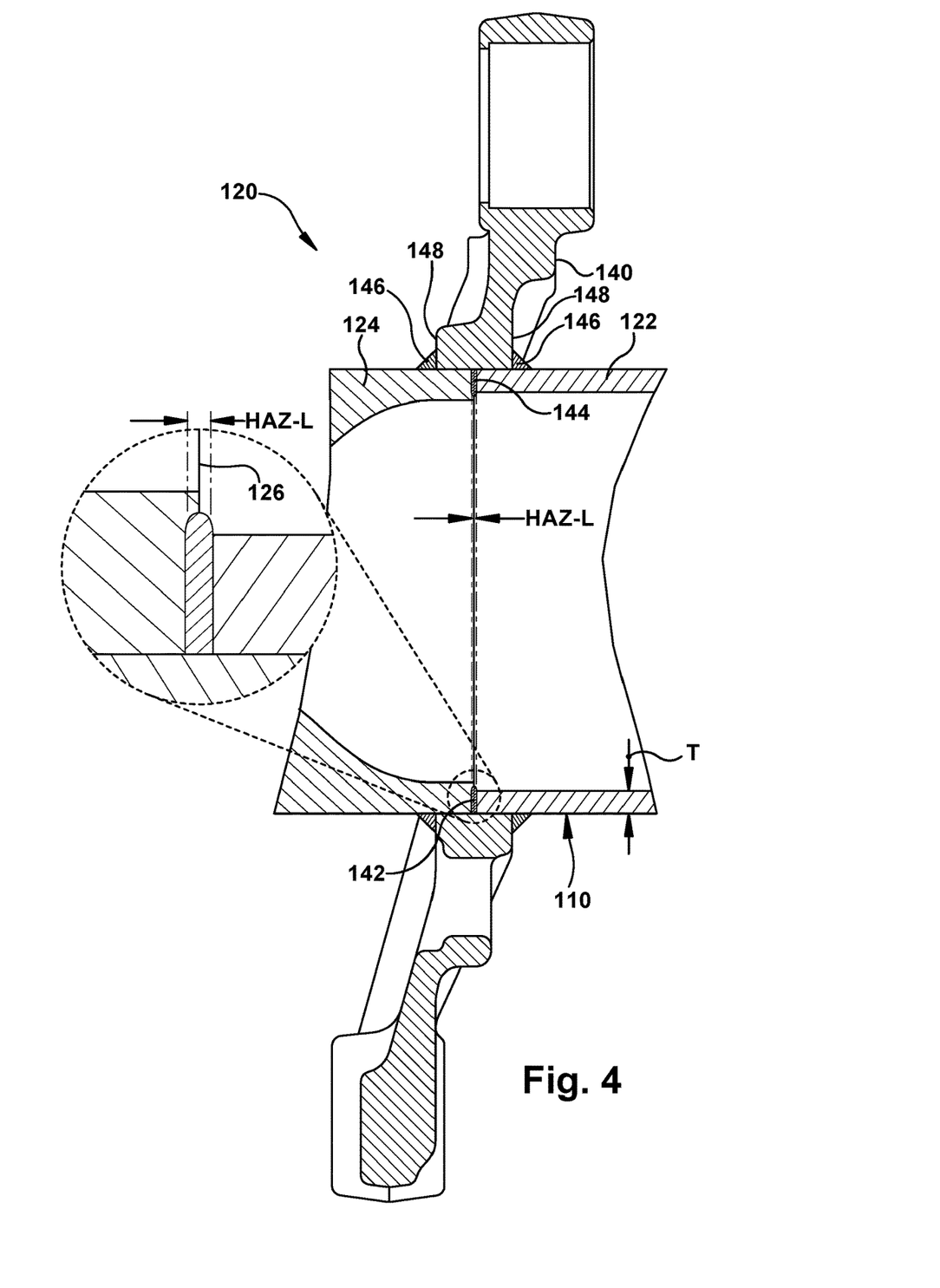
FIG. 4 is an enlarged fragmentary cross-sectional view of a portion of an axle and wheel end assembly, similar to FIG. 3, which is manufactured according to another type of joining operation.

According to another aspect of the disclosed subject matter and illustrated in FIG. 4, an axle and wheel end assembly 120 is provided. End surfaces 142, 144 of a tubular axle housing 122 and a spindle 124 of an axle 110 may be laser welded together. The annular end surface 144 of the spindle 124 is laser welded to the annular end surface 142 of the tubular axle housing 122 at weld joint 126 or attachment periphery. The weld joint 126 is made by a laser welding process and extends 360° around the entire periphery of the axle and wheel end assembly 120. As a result of the laser welding process, little if any surface discontinuities form and curl shape stress concentrations are eliminated.

A heat affected zone HAZ-L is created by the laser welding operation adjacent the weld joint 126 or attachment periphery. The heat affected zone HAZ-L extends in opposite longitudinal or axial directions from the weld joint 126 for a relatively short distance. The axial distances that the heat affected zone HAZ-L extends from the weld joint 126 is relatively smaller than the heat affected zone HAZ at weld joint 26 of the axle and wheel end assembly 20 that was created, for example by friction welding. The heat affected zone HAZ-L created by laser welding generally has little or no distortion near the weld joint 126 and eliminates or minimizes post weld machining of things, such as bearing journals. The exact axial distances that the heat affected zone HAZ-L extend may depend on a number of factors, such as the materials used, the energy applied by the laser equipment and the speed of relative movement between the axle and wheel end assembly 120 and laser emitter.

Laser welding the axle central tube housing 122 to the spindle 124 is a relatively efficient use of material. That is because additional lengths of the tubular axle housing 122 and/or the spindle 124 would not be needed to create residual weld material with a curl shape large enough to flush out oxides that may be formed during a friction welding process. This reduces the amount of steel material needed to create a finished axle and wheel end assembly 120. Additionally, curl shape stress concentrations created by surface discontinuities are completely eliminated.

The outer diameters of the tubular axle housing 122 and spindle 124 are illustrated in FIG. 4 as being substantially the same at their respective annular end surfaces 142, 144. The inner diameters of the tubular axle housing 122 and spindle 124 are illustrated as being different at their respective annular end surfaces 142, 144. For example, the tubular axle housing 122 has a relatively larger inner diameter than the inner diameter of the skirt of the spindle 124. That is, the wall thickness of the tubular axle housing 122 is less than the wall thickness of the skirt of the spindle 124 and thereby contributes to a relatively lighter axle and wheel end assembly 120. A reduced inventory of relatively expensive spindles 124 can be accomplished because the end surfaces 144 of the skirt of the spindles do not have to match inner diameters with end surfaces 142 of the tubular axle housing 122. It is contemplated that the inner diameters of the axle central tube housing 122 and of the spindle 124 may be the same.

The axle and wheel end assembly 120 further includes reinforcing structure 140, preferably in the form of brake retention structure commonly known as a spider, torque plate or brake component mounting structure, fixed to both of the tubular axle housing 122 and the spindle 124. Any suitable means can be used to permanently attach the reinforcing structure 140 to the spindle 124 and the tubular axle housing 122, for example such as welding to form welds 146 extending around the entire outer circumferences of the tubular axle housing 122 and spindle 124. The reinforcing structure 140 is located to span and encompass at least a portion of the weld joint 126 and thereby strengthen and protect the weld joint. Preferably, the reinforcing structure 140 is located to encompass or encircle substantially all of the weld joint 126 and the heat affected zone HAZ-L for 360° in the peripheral or circumferential direction around the tubular axle housing 122 and spindle 124. Also, the reinforcing structure 140 is located to span or bridge the heat affected zone HAZ-L in a longitudinal or axial direction of the axle central tube housing 122 and spindle 124. It is intended that the welds 146 are to be considered separate from, and form no part of, the reinforcing structure 140. The reinforcing structure 140 has axially opposite side end surfaces 148. A first one of the side end surfaces 148 is located axially on one side of the weld joint 126 and the other second side end surface is located axially on the opposite side of the weld joint.

This improvement is accomplished by providing the axle and wheel end assembly 120 with a laser weld joint 126 that is protected and strengthened with reinforcing structure 140, such as a spider, torque plate or brake mounting structure, that completely encompasses or encircles as well as bridges or spans the weld joint 126 and the heat affected zone HAZ-L (FIG. 4) near the joint. The resultant increase in section modulus about the weld joint 126 and heat affected zone HAZ-L by the reinforcing structure 140 strengthens and protects the axle and wheel end assembly 120.

The improved axle and wheel end assembly 20, 120 provides a flexibility by using different types of welding. The improved axle and wheel end assembly 20, 120 potentially uses less material that can reduce cost and inventory. The improved axle and wheel end assembly 20, 120 and method of manufacturing may also reduce scrap.

The disclosed subject matter successfully incorporates a relatively lightweight axle into an axle/suspension system for a heavy-duty vehicle. More specifically, the disclosed subject matter can save weight by utilizing a relatively larger diameter axle with a relatively thin axle wall, yet still provides the requisite stiffness performance characteristics, strength and durability of the axle and wheel end assembly 20, 120 that is required in the transportation industry.

According to another aspect, a method of manufacturing the axle and wheel end assembly 20 is disclosed. The method includes providing the tubular axle housing 22 with the annular end surface 42. The annular end surface 44 of the spindle 24 is joined to the annular end surface 42 of the tubular axle housing 22 to form an attachment periphery or weld joint 26. Reinforcing structure 40, such as a spider, torque plate or brake mounting structure, is fixed to the tubular axle housing 22 and the spindle 24 to encompass at least a portion of the weld joint 26.

The joining of the central tube housing 22 to the spindle 24 may be done by any suitable process, such as a friction welding process that tends to create the heat affected zone HAZ adjacent the weld joint 26. The reinforcing structure 40 is preferably located to encompass substantially all of the weld joint 26. Any suitable means to permanently attach the reinforcing structure 40 to the spindle 24 and the tubular axle housing 22 may be used, for example such as welding to form welds 46 extending about the entire circumferential periphery of the tubular axle housing and the spindle. The reinforcing structure 40 is located to encompass at least a portion of the joint 26 and thereby strengthen and protect the joint. Preferably, the reinforcing structure 40 is located to encompass or encircle substantially all of the joint 26 and the heat affected zone HAZ for 360° in the peripheral or circumferential direction around the axle central tube housing 22 and spindle 24. Also, the reinforcing structure 40 is located to span or bridge the heat affected zone HAZ in a direction along a longitudinal central axis A of the tubular axle housing 22 and spindle 24.

It will be appreciated that the location of the reinforcing structure 40 is not necessarily moved in a direction along the longitudinal axis A of the axle and wheel end assembly 20 over weld joint 26. The locations of the weld joint 26 and reinforcing structure 40 are dictated by the requirements of brakes and/or tire/wheel assemblies of a particular application. The length of the axle central tube housing 22 and the lengths of the spindles 24 are adjusted to accommodate the location required of the reinforcing structure 40. It is contemplated that the reinforcing structure 40 could be used for mounting drum or disc brake components. It is also contemplated that the method described may be used to manufacture the axle and wheel end assembly 120.

It is to be understood that the structure of the axle and wheel end assembly 20, 120 for heavy-duty vehicles with the reinforced weld joint 26, 126 may be altered or rearranged, or certain components omitted or added, without affecting the overall concept or operation of the disclosed concept. For example, the reinforcing structure 40, 140 could be in a form other than brake retention structure, such as a "wrap" or sleeve of reinforcing material positioned about the weld joint 26, 126 and heat affected zone HAZ, HAZ-L. The use of the word "encompass" is intended to include circumferentially surrounding and/or axially bridging or spanning.

It is also to be understood that the disclosed subject matter finds application in all types of axle and wheel end assemblies including other types of axle and wheel end assemblies than those shown and described above, without affecting the concept or operation. While reference is made generally to a heavy-duty vehicle for the purpose of convenience, it has been with the understanding that such reference includes trucks, tractor-trailers or semi-trailers, and trailers thereof.

The disclosed subject matter has been described with reference to specific aspects. It is understood that this description and illustration is by way of example and not by way of limitation. Potential modifications and alterations will occur to others upon a reading and understanding the disclosed subject matter, and it is understood that the disclosed subject matter and claims include all such modifications and alterations and equivalents thereof.

What is claimed is:

1. An axle and wheel end assembly comprising:
an axle housing having an end surface;
a spindle having an end surface fixed to the end surface of the axle housing at an attachment periphery; and
reinforcing structure fixed to the axle housing and to the spindle, the reinforcing structure being located to encompass at least a portion of the attachment periphery, the reinforcing structure having axially opposite end surfaces, one of the end surfaces being located axially on one side of the attachment periphery and the other end surface being located axially on an opposite side of the attachment periphery.

2. The axle and wheel end assembly of claim 1 wherein the reinforcing structure encompasses substantially all of the attachment periphery.

3. The axle and wheel end assembly of claim 1 wherein the reinforcing structure comprises brake component mounting structure.

4. The axle and wheel end assembly of claim 1 wherein the end surfaces of the axle housing and the spindle each have an annular shape with substantially equal outer diameters.

5. The axle and wheel end assembly of claim 4 wherein the end surfaces of the axle housing and the spindle have end surfaces with substantially equal inner diameters.

6. The axle and wheel end assembly of claim 4 wherein the end surfaces of the axle housing and the spindle have end surfaces with differing inner diameters.

7. The axle and wheel end assembly of claim 4 wherein the end surfaces of the axle housing and the spindle are joined together in a manner that creates a heat affected zone adjacent the attachment periphery.

8. The axle and wheel end assembly of claim 7 wherein the end surfaces of the axle housing and the spindle are joined together by a friction welding operation that creates the heat affected zone.

9. The axle and wheel end assembly of claim 7 wherein the end surfaces of the axle housing and the spindle are joined together by a laser welding operation that creates the heat affected zone.

10. The axle and wheel end assembly of claim 7 wherein the reinforcing structure encompasses substantially all of the heat affected zone.

11. The axle and wheel end assembly of claim 1 wherein the axle housing is tubular with a wall thickness of less than 0.300 inch and an outer diameter of more than 5.5 inches.

12. The axle and wheel end assembly of claim 11 wherein the axle housing has wall thickness of 0.250 inch and an outer diameter of 5.75 inches.

13. The axle and wheel end assembly of claim 1 wherein the axle housing is tubular with a wall thickness of less than 0.640 inch and an outer diameter of more than 4.75 inches.

14. The axle and wheel end assembly of claim 13 wherein the axle housing has wall thickness of 0.460 inch and an outer diameter of 5.00 inches.

15. A method of manufacturing an axle and wheel end assembly, the method comprising the steps of:
providing an axle with an axle housing having an end surface;
joining an end surface of a spindle to the end surface of the axle housing to form an attachment periphery;
fixing reinforcing structure to the axle housing and the spindle to encompass at least a portion of the attachment periphery;
forming axially opposite end surfaces on the reinforcing structure; and
locating axially one of the end surfaces of the reinforcing structure on one side of the attachment periphery and locating axially another end surface of the reinforcing structure on an opposite side of the attachment periphery.

16. The method of claim 15 including the step of locating the reinforcing structure to encompass substantially all of the attachment periphery.

17. The method of claim 15 wherein the step of joining the end surface of the spindle to the end surface of the axle housing includes the step of welding to create a heat affected zone adjacent the attachment periphery and the reinforcing structure encompasses substantially all of the heat affected zone.

18. The method of claim 17 wherein the welding includes the step of friction welding.

19. The method of claim 17 wherein the welding includes the step of laser welding.

20. The method of claim 15 wherein the step of fixing the reinforcing structure includes welding reinforcing structure to the axle housing and the spindle.

21. An axle and wheel end assembly comprising:
An axle housing having an end surface;
a spindle having an end surface that is joined to the end surface of the axle housing at a continuous attachment periphery; and
brake component mounting structure fixed to the axle housing and to the spindle to encompass substantially all of the attachment periphery, axially opposite end surfaces formed on the brake component mounting structure, one of the end surfaces being located axially on one side of the attachment periphery and the other end surface being located axially on the opposite side of the attachment periphery.

22. The axle and wheel end assembly of claim 21 wherein the axle housing is tubular and the end surfaces of the tubular axle housing and the spindle are annular and have substantially equal outer diameters.

23. The axle and wheel end assembly of claim 22 wherein the annular end surfaces of the tubular axle housing and the spindle have substantially equal inner diameters.

24. The axle and wheel end assembly of claim 22 wherein the annular end surfaces of the tubular axle housing and the spindle have differing inner diameters.

25. The axle and wheel end assembly of claim 21 wherein the axle housing and the spindle have annular end surfaces being joined together creating a heat affected zone adjacent the attachment periphery and the brake component mounting structure encompasses substantially all of the heat affected zone.

26. The axle and wheel end assembly of claim 25 wherein the annular end surfaces of the tubular axle housing and the spindle are joined together by a friction welding operation.

27. The axle and wheel end assembly of claim 25 wherein the annular end surfaces of the tubular axle housing and the spindle are joined together by a laser welding operation.

28. The axle and wheel end assembly of claim 21 wherein the axle housing is tubular with a wall thickness of less than 0.300 inch for an outer diameter of more than 5.5 inches.

29. The axle and wheel end assembly of claim 28 wherein the axle housing has wall thickness of 0.250 inch and an outer diameter of 5.75 inches.

30. The axle and wheel end assembly of claim 21 wherein the axle housing is tubular with a wall thickness of less than 0.640 inch and an outer diameter of more than 4.75 inches.

31. The axle and wheel end assembly of claim 30 wherein the axle housing has wall thickness of 0.460 inch and an outer diameter of 5.00 inches.

* * * * *

UNITED STATES PATENT AND TRADEMARK OFFICE
CERTIFICATE OF CORRECTION

PATENT NO. : 10,525,769 B2
APPLICATION NO. : 15/796892
DATED : January 7, 2020
INVENTOR(S) : Dane Gregg et al.

It is certified that error appears in the above-identified patent and that said Letters Patent is hereby corrected as shown below:

In the Claims

Claim 12, Column 10, Lines 18-19, delete "the axle housing has wall thickness of 0.250 inch and an outer diameter of 5.75 inches" and insert --the wall thickness of the axle housing is 0.250 inch and the outer diameter of the axle housing is 5.75 inches--.

Claim 14, Column 10, Lines 24-25, delete "the axle housing has wall thickness of 0.460 inch and an outer diameter of 5.00 inches" and insert --the wall thickness of the axle housing is 0.460 inch and the outer diameter of the axle housing is 5.00 inches--.

Claim 28, Column 12, Line 9, after the word "inch" delete "for" and insert --and--.

Signed and Sealed this
Fourteenth Day of April, 2020

Andrei Iancu
*Director of the United States Patent and Trademark Office*